(12) United States Patent
Osen

(10) Patent No.: US 7,926,050 B2
(45) Date of Patent: Apr. 12, 2011

(54) SECURE METHOD TO UPDATE SOFTWARE IN A SECURITY MODULE

(75) Inventor: Karl Osen, Dardagny GE (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 981 days.

(21) Appl. No.: 11/147,221

(22) Filed: Jun. 8, 2005

(65) Prior Publication Data
US 2005/0283777 A1 Dec. 22, 2005

(30) Foreign Application Priority Data
Jun. 17, 2004 (EP) .................................. 04102768

(51) Int. Cl.
*G06F 9/44* (2006.01)
*G06F 12/14* (2006.01)

(52) U.S. Cl. ....................... 717/172; 713/189
(58) Field of Classification Search .................... 717/168
See application file for complete search history.

(56) References Cited

U.S. PATENT DOCUMENTS

| | | | |
|---|---|---|---|
| 4,323,921 A | 4/1982 | Guillou | |
| 4,531,020 A | 7/1985 | Wechselberger et al. | |
| 4,803,725 A | 2/1989 | Horne et al. | |
| 5,956,405 A * | 9/1999 | Yuval | 380/29 |
| 6,160,890 A | 12/2000 | Tatebayashi et al. | |
| 6,252,961 B1 * | 6/2001 | Hogan | 380/37 |
| 6,263,437 B1 * | 7/2001 | Liao et al. | 713/169 |
| 6,292,568 B1 | 9/2001 | Akins, III et al. | |
| 6,324,287 B1 * | 11/2001 | Angert | 380/43 |
| 6,338,435 B1 | 1/2002 | Carper | |
| 6,373,946 B1 * | 4/2002 | Johnston | 380/211 |
| 6,466,671 B1 | 10/2002 | Maillard et al. | |

(Continued)

FOREIGN PATENT DOCUMENTS

EP 0 679 029 A1 3/1992

(Continued)

OTHER PUBLICATIONS

T. E. Lindquist et al., "A Java Cryptography Service Provider Implementing One-Time Pad", Proceedings of the 37$^{th}$ Hawaii International Conference on System Sciences—2004, IEEE, pp. 1-6.

(Continued)

*Primary Examiner* — James D Rutten
(74) *Attorney, Agent, or Firm* — Harness, Dickey & Pierce, P.L.C.

(57) ABSTRACT

Transmission method of a message containing a program block that avoids the consequences of a possible malicious decryption of this message is proposed. This is achieved through a secure method to update software embedded in a security module, comprising formation of a first updating program block, determination of a target memory zone of said security module, determination, through said security module, of a pre-registered content in said target memory zone, formation of a second program block obtained by the mixing of all or a part of the pre-registered content with the first program block, transmission of the second program block to the security module, reception of the second block by the security module, reading of the target memory zone, obtaining and writing in the target memory zone of the first block by the inverse mixing of all or part of the second block and of the target memory zone content.

3 Claims, 1 Drawing Sheet

U.S. PATENT DOCUMENTS

| | | | |
|---|---|---|---|
| 2002/0199096 A1* | 12/2002 | Wenocur et al. | 713/153 |
| 2003/0051090 A1 | 3/2003 | Bonnett et al. | |
| 2003/0140237 A1 | 7/2003 | Bacon et al. | |
| 2003/0159070 A1* | 8/2003 | Mayer et al. | 713/201 |
| 2003/0163508 A1* | 8/2003 | Goodman | 709/100 |
| 2003/0182414 A1* | 9/2003 | O'Neill | 709/223 |
| 2004/0003263 A1 | 1/2004 | Brique et al. | |
| 2004/0044894 A1* | 3/2004 | Lofgren et al. | 713/176 |
| 2004/0107349 A1 | 6/2004 | Sasselli et al. | |
| 2004/0133794 A1* | 7/2004 | Kocher et al. | 713/193 |

FOREIGN PATENT DOCUMENTS

| | | |
|---|---|---|
| EP | 1 369 765 A2 | 12/2003 |
| WO | WO 98/43431 | 10/1998 |
| WO | WO 01/45414 A | 6/2001 |
| WO | WO 0145414 A2 * | 6/2001 |
| WO | WO 03/038574 A2 | 5/2003 |
| WO | WO 03/085497 A2 | 10/2003 |
| WO | WO 03/088019 A2 | 10/2003 |

OTHER PUBLICATIONS

European Search Report as issued on Oct. 19, 2004.
George I. Davida et al, "Defending Sysems Against Viruses Through Cryptographic Authentication," IEEE, 1989, pp. 312-318.
Definition, Jul. 30, 2001, techterms@whatis.com.
Interesting Devices Ltd., Dec. 3, 2009, http://id-discussions.com/forum/showthread.php?t=8176, Jetsoft Enterprises, Ltd.

* cited by examiner

SECURE METHOD TO UPDATE SOFTWARE IN A SECURITY MODULE

FIELD OF THE INVENTION

The present invention refers to the domain of security modules, in particular the security modules having software capable of being updated.

PRIOR ART

These security modules are responsible for numerous functions such as authentication, the verification of rights or the management of a credit. These functions need large processing capacities and need to have fast microprocessors in which a large part of the software is stored in a rewritable memory.

Thus, once a programming error or a security leak has been detected, a correction block is prepared and stored in a free region of the memory. A modification is also carried out in the program part to take advantage of the functionalities of this new program block.

When this type of module is used in a decentralized system, the updating of the security modules is carried out by the available telecommunications means such as diffusion (a large number of modules receive the same message) or a point-to-point connection.

In both cases, but particularly in the first case, the updating message is vulnerable to attacks by malicious individuals. The analysis of the message received by a module could give revealing indications with respect to the functioning of said module and reveal secrets connected to security.

It is certain that these messages are encrypted, but important means are activated by these malicious individuals in order to decipher these messages and extract the contents.

The modules considered in this invention are used in Pay-TV, in mobile telephones and even in banking applications.

In the following, the domain of Pay-TV is taken as an example.

According to a known process, the surveillance centre is informed of a security leak and will prepare a programme block, called "patch" which is intended to update the software of the security module.

The block prepared in this way is encrypted by one or several keys pertaining to the security modules. It is possible to encrypt this block either using a global key, common to all the security modules, or using a personal key, pertaining to each module. In the latter case, it will be necessary to prepare the same number of messages as they are different security modules.

The message is then sent to the management centre that disposes of transmission means towards the modules. In a unidirectional system, the message is repeated during a given period in order to ensure that each module has received it.

The man skilled in the art is placed in a difficult position when a security leak is detected because he/she must evaluate the risk of this type of message being analyzed by a third party and the risk of leaving this leak open. At times this dilemma led to the situation in which one has forbidden himself to correct a fault of the programme because the risk of comprehension of the substitute programme was too great.

The updating of programs in a Pay-TV decoder is well known and described, for example, in the document US2004/107349. The program modules are sent to the decoder encrypted by a key that is used once. This is the principle of the strike list which is applied here. Once the programme module has been received it is stored in the memory of the decoder and activated according to a usual protocol (diversion of an address towards the patch).

BRIEF DESCRIPTION OF THE INVENTION

The aim of this invention is to allow the man skilled in the art to transmit a message containing a program block in a message without having to worry about the result of a malicious decryption of this message.

This aim is achieved by a secure method to update software in a security module, this method comprising the following steps:
  formation of a first updating program block (PBI),
  determination of a target memory zone of said security module,
  determination through said security module, of a pre-registered content (MM_Ref) in said target memory zone,
  formation of a second program block (SBI) obtained by the mixing of all or a part of the pre-registered content with the first program block (PBI),
  transmission of the second program block (SBI) to the security module,
  reception of the second block by the security module,
  reading of the target memory zone (MEM),
  obtaining and writing in the target memory zone of the first block by the inverse mixing of all or part of the second block and of the target memory zone content.

Therefore, thanks to the invention, the transmitted code (second block) has no relation with the first block for those who have no knowledge of the content of the target memory.

A third party succeeding to decipher the message will learn nothing more about the functioning of the security module.

This method can apply to the sending of the same message to all the security modules and in this case, it is considered that the content of the target memory zone is the same for all the modules. If individual addressing is carried out, it is possible that the content of each memory is different. Once the first program block has been generated, it is mixed with the data of each security module to create the same number of second programme blocks.

BRIEF DESCRIPTION OF THE DRAWINGS

The invention will be better understood thanks to the following detailed description that refers to the enclosed drawings that are given as a non-limitative example, namely.

DETAILED DESCRIPTION

According to a first embodiment, the content of the target memory is pre-registered with quasi-random values. At the time of the personalization of this type of module, randomly generated data MM_Ref is stored on one hand in the security module MEM and on the other hand at the management centre.

According to a second embodiment, the pre-registered data is made up of a program code that could be executed by the processor of the security module. In fact, this code is never executed and serves as an initialization value of the updating region. As in the preceding example, all the modules can have the same dummy program or each module receives a different program.

Figure 1:
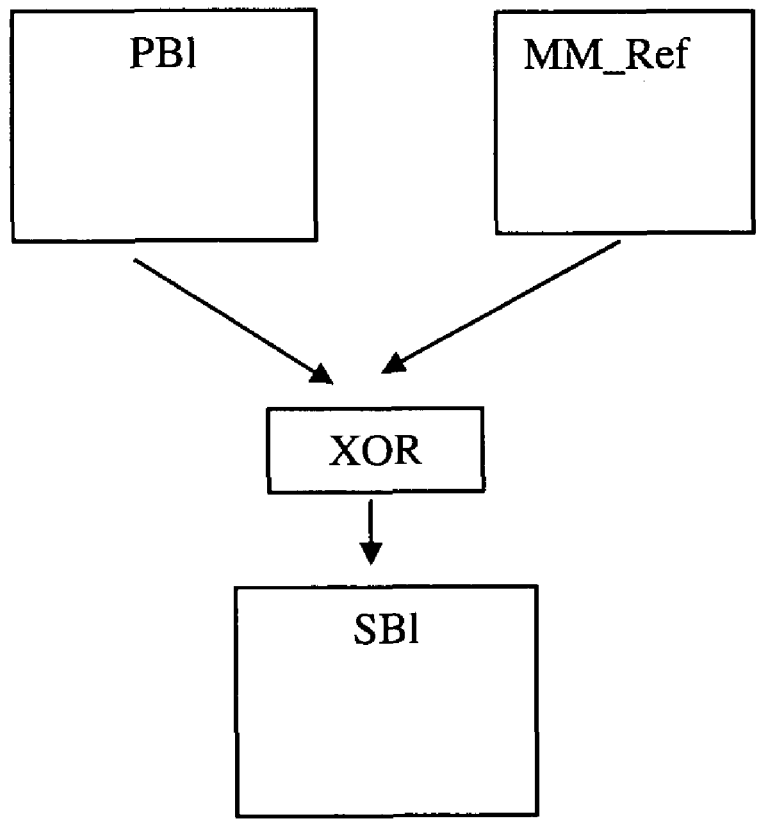
FIG. 1 shows the generation process of the second block.

FIG. 1 shows the process of formation of a second program block intended for diffusion.

When a program block PBI is ready to be diffused, the method of the invention consists in determining the future localization of this block in the security module. Once this localization is known, it is possible to find the content that had been programmed at the time of the personalization thanks to data stored in the management centre. Once this data is known, the operation consists of mixing this data with the program block PBI in order to obtain a new data block SBI.

This mixing operation can be of different kinds. The simplest way is to use a XOR function between the program block PBI and the pre-registered data MM_Ref.

A second example of mixing consists in enciphering each memory location of the program block PBI with the content of the pre-registered data MM_Ref.

The result of this mixing forms the second program block SBI. This block composed in this way can be transmitted to the related security module, according to the communication mode available between the management centre and the security module. It is enciphered by encryption keys of the system according to known methods.

Figure 2:
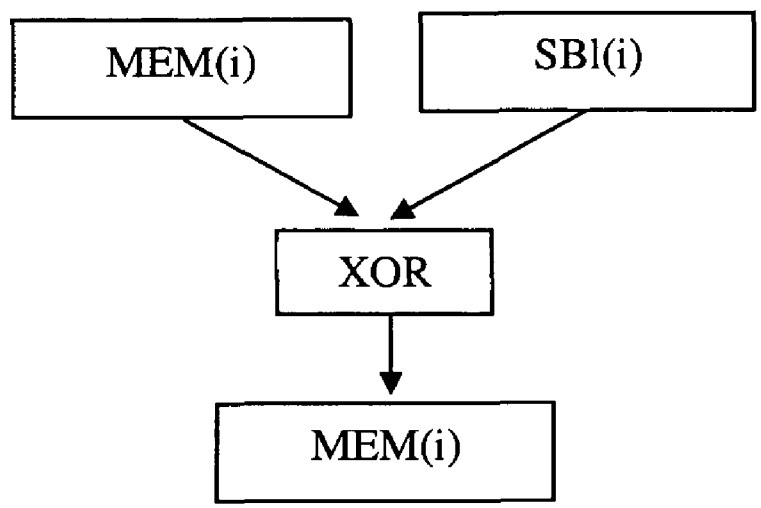
FIG. 2 shows the writing process in the memory of the security module.

FIG. 2 shows the writing process in the memory of the security module.

The writing operation of the new program block in the memory of the security module, once the second block has been received, passes through a reading operation of the content of the target memory location. According to our example, each memory location i of the target area MEM is read and processed (or mixed) according to the chosen algorithm. In this example, each memory location is mixed with the corresponding location i of the second block SBI of the program. The result is registered in the memory of the security module.

It should be noted that the program block to be updated is accompanied by verification data according to known modes (hash, CRC etc). Once the program is stored in the module memory, and has been duly verified, it can generally be activated by the modification of a part of the program in the main area.

This process can be recurrent, that is to say that if one wishes to modify a part in the program area that has already received a program, the former program functions as a pre-registered value. According to one example wherein the new program would occupy more space, the management centre takes the contents of the previous program as pre-registered values, and for memory space still not used, would use the pre-registered values generated at the time of personalization.

In practice, the management centre will preserve a virtual security module whose content represents the content of the security module in the location. All the programs intended for the security modules are also introduced into the virtual module.

According to a variant of the embodiment, only one part of the target zone is pre-registered by specific values, for example one location in three. The rest are left blank. Therefore, the mixture will be executed only on one location in three, the other locations being left without modification.

The invention claimed is:

1. A secure method to update software embedded in a security module, this method comprising the following steps:
   formation of a first updating program block,
   determination of a target memory zone of said security module,
   determination of a pre-registered content in said target memory zone of said security module,
   formation of a second program block by mixing all or a part of the pre-registered content with the first updating program block,
   transmission of the second program block to the security module,
   reception of the second program block by the security module,
   reading of the content of the target memory zone,
   obtaining the first updating program block from the second program block by using the target memory zone content as a key and by inverse mixing the target memory zone content and all or part of the second program block; and
   overwriting the target memory zone content with the obtained first updating program block,
      wherein the pre-registered content in said target memory zone of said security module is made up of a program code executable by the security module.

2. The method according to claim 1, wherein the inverse mixing operation is an exclusive OR function.

3. The method according to claim 1, wherein the inverse mixing operation is an encryption function with the content of the pre-registered memory as the encryption key.

* * * * *